June 3, 1930.  E. W. MITCHEL  1,761,358
CLINCH-ON NUT
Filed March 2, 1929
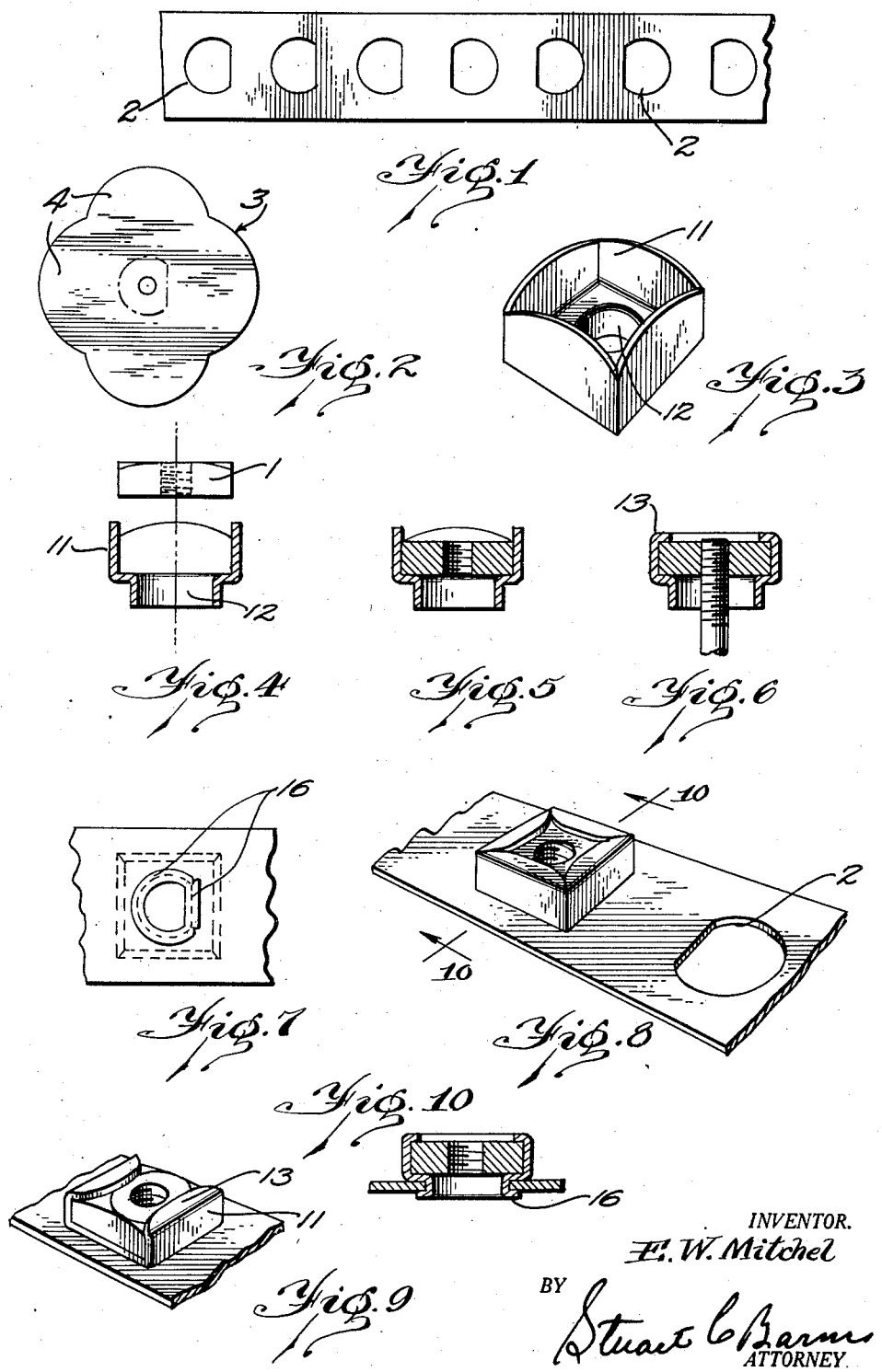
INVENTOR.
E. W. Mitchel
BY
ATTORNEY.

Patented June 3, 1930

1,761,358

UNITED STATES PATENT OFFICE

EDWARD W. MITCHEL, OF DETROIT, MICHIGAN, ASSIGNOR TO F. L. McLAUGHLIN CORPORATION, OF DETROIT, MICHIGAN, A CORPORATION OF MICHIGAN

CLINCH-ON NUT

Application filed March 2, 1929. Serial No. 343,885.

This invention relates to clinch-on nuts, and has to do particularly with nuts adapted to be anchored in fixed position.

In the assembly and fabrication of sheet metal articles and the like, it is often desirable or necessary to secure the fastening nut in fixed non-rotative position upon one of the parts whereby to directly receive the bolt or screw to permit quick and easy assembly. Various types of nuts have been designed for insertion and assembly in fixed relation to a sheet metal part preparatory to receiving the fastening or securing bolt, but heretofore these nuts of the prior art have been relatively expensive in design and manufacture in addition to the difficulty of requiring a special type of aperture for receiving the same.

It is the object of the present invention to provide a nut of the type adapted to be initially clamped or fixed into position preparatory to receiving the bolt or screw but which utilizes a common commercial nut in combination with separate means for quickly and positively securing the same in the desired fixed position. By using a common nut of standard manufacture and an exterior or separate positioning means, it is possible to materially reduce the cost of the nut as well as to materially simplify the fabrication and assembly thereof.

In the drawings:

Fig. 1 illustrates a strip of sheet metal provided with pushed out D-shaped apertures for receiving and positioning nuts.

Fig. 2 illustrates the preferred first step in the fabrication of my novel nut wherein a flat piece of sheet metal is stamped out in the form shown.

Fig. 3 is a perspective view of a formed sheet metal casing ready for the reception of a standard nut.

Figs. 4, 5, and 6 illustrate successive steps in the complete fabrication of a nut ready for assembly with the sheet metal article.

Fig. 8 is a fragmentary perspective view of my novel nut unit clamped in position preparatory to receiving the bolt.

Fig. 10 is a sectional view taken on line 10—10 of Fig. 8 illustrating the preferred manner of securing the nut unit to the sheet metal article.

Fig. 7 is a bottom plan view of Fig. 14.

Fig. 9 illustrates a slightly modified form of nut unit in that only two sides or wings are used in positioning and holding the common nut.

The important feature of the present invention is the forming of a novel nut unit of the type adapted to be clamped in position, wherein the basic element of said nut unit is a standard or common nut such as illustrated at 1 in Fig. 4. While it will be understood that in securing this type of nut to the sheet metal article that any form of aperture may be used, the present nut is particularly adapted to a D-shaped aperture such as shown at 2 in Fig. 1. This D-shaped aperture is preferred by various manufacturers of this type of work and in addition it is obviously a very inexpensive type of aperture to form.

In forming the nut unit adapted to be permanently positioned in such aperture, I preferably blank out a sheet metal unit 3, as shown in Fig. 2, and in forming this initial blank I preferably form the same with a substantially clover leaf shape so as to form the side or ear member 4 and simultaneously form a small aperture 5 in the center thereof. The size of this aperture 5 determines the depth of the extruded D-shaped portion of the nut unit as will be later described.

After the initial blanking step, I preferably form the casing for the standard nut unit in one operation. The completed casing for the nut unit is shown in Fig. 3 wherein the side walls are designted 11 and the D-shaped portion 12.

A standard or common nut 1 is then dropped into this casing unit as illustrated in Figs. 4 and 5, and the side walls bent over as at 13 to complete the nut unit as shown in Fig. 6.

Regardless of the method used, in fabricating my novel nut unit, in assembling the same with any sheet metal article the D-shaped portion 12 of the nut unit is inserted in the D-shaped aperture punched in the sheet metal article, after which the edges of the D-shaped extrusion are turned over as shown at 16 in Figs. 10 and 7. This latter operation may be either a stamping operation or a hand hammering operation. The turned over portion of the D-shaped extrusion is sufficient to securely clamp the nut unit to the sheet metal article and the registration of the flat sides of the extrusion 12 and apertures 2 prevent any twisting of the nut.

It will thus be seen that by using a very inexpensive and easily formed sheet metal casing, that I am able to use a standard nut that may be purchased for a very small sum as compared to the specially fabricated nuts of this type. Furthermore, this novel nut may be used with D-shaped apertures which further reduce the complete cost of assembly and, furthermore, the sheet metal casing makes possible a more rigid and substantial clamping than where the blocking or clamping means is formed as an integral part of the nut.

In using the word "extruded" in the specification and claims, it will be understood that I am referring to the integral punched out or drawn portion 12 as distinguished from a plain bent portion. It will be understood that the shell or cage member and particularly the portion 12 thereof is distorted of itself to perform the clinching operation. In other words, as best shown in Fig. 10, the clinching of the nut to the plate is obtained solely by distortion of the exterior sheet metal casing.

What I claim is:

1. As a new article of manufacture, a nut unit of the type adapted to be initially clinched in position for receiving a bolt, comprising a standard nut member for receiving the bolt and a sheet metal casing permanently surrounding said nut on the sides, bottom and top and having an extruded portion extending at right angles to the plane of the nut and adapted to be distorted to serve as the sole means for clinching the nut in position.

2. Fastening structure of the type wherein a nut is attached to a sheet of metal for reception of a bolt, comprising a standard threaded nut of the type having angularly positioned side walls, a separate member complementally and permanently formed for engaging said side walls to prevent the nut from turning and also formed to engage the top and bottom of the nut, said separate member having an extruded portion formed as a continuous wall extending through an aperture in said sheet metal article and being deformed to engage said sheet metal article whereby to permanently clinch and lock the complete nut unit in position.

In testimony whereof I affix my signature.

EDWARD W. MITCHEL.